PROGRAM TAPE DISCRIMINATOR

Filed Aug. 17, 1966

INVENTORS:
Andrew Balint,
Hans Christoph Wohlrab
By Griffin and Branigan
Attys 3,476,477
PROGRAM TAPE DISCRIMINATOR
Andrew Balint, Park Ridge, and Hans Christoph Wohlrab, Deerfield, Ill., assignors to Bell & Howell Company, Chicago, Ill., a corporation of Illinois
Filed Aug. 17, 1966, Ser. No. 573,004
Int. Cl. G03b 27/76, 27/78
U.S. Cl. 355—35 15 Claims The present invention relates to a method and apparatus for discriminating between tapes of a first type and tapes of a second type. The invention finds particular utility in a film printing system wherein a film printer may print from a developed film strip which moves in either a forward or reverse direction, the printing operation being controlled by a program recorded on a tape which is read by a tape reader.

United States Patent No. 2,990,762 describes a photographic film printing system wherein light changes required during the printing operation are automatically programmed by coded perforations in a control tape. The film printer disclosed in this patent is capable of printing in only one, i.e., the forward direction. When one printing of the developed film strip has been completed the film strip must be rewound before another printing operation can be started. Since the film strip may be thousands of feet long the rewind operation takes a considerable amount of time.

To avoid the requirement that the film strip be rewound after each printing operation film printers were developed having the capability of printing in either the forward or reverse direction. However, in these newer devices it is necessary to use one program tape when printing a film strip in the forward direction and another program tape when printing the same film strip in the reverse direction. A "forward" program tape is inserted in the tape reader and a switch is set on the printer to drive the film strip through the printer in the forward direction. When the first printing operation is completed the operator merely inserts a "reverse" program tape in the tape reader and sets the switch on the printer so as to cause the film strip to move through the printer in the reverse direction.

Errors on the part of the operators of the newer systems have caused considerable lost time and expense. For example, the operator may set the switch for forward printing but insert a reverse program tape in the tape reader. The error may pass unnoticed until the exposed raw stock has been processed and viewed optically. Thus, for each error thousands of feet of raw stock may be ruined and considerable processing time lost.

An object of the present invention is to provide a novel method and apparatus for detecting operator errors of the type described above.

An object of the present invention is to provide a novel method and apparatus for discriminating between forward program tapes and reverse program tapes in a film strip printer system wherein such tapes program the system and the device has additional means for controlling the direction of movement of the film strip through the printer.

Although the invention is disclosed as having utility in a film printer system and is admirably suited for that purpose, it will be obvious that the invention may be used in any system wherein a device is operated in either a first or a second mode and a particular type of program tape is required for each mode of operation.

Therefore, a further object of the invention is to provide a novel means suitable for use with a device that may operate in any one of several modes and is programmed by a different type of program tape in each of said modes, said means detecting when the type of program tape used is not the type required for the mode of operation of said device.

In a preferred embodiment hereinafter described, the above-stated objects are accomplished by recording identifying indicia on the leaders of the tapes thus identifying them as being of a first type (i.e. reverse) or a second type (i.e. forward). The tapes are read by a tape reader which normally controls another device such as, for example, a film strip printer. The printer has a manual switch for controlling the forward or reverse movement of the film strip through the printer and the switch also controls a discriminator circuit. Means are provided in the tape reader for sensing the identifying indicia on the tape leaders and producing output signals indicating the type of tape in the reader. These signals are fed to the discriminator circuit which determines whether or not the setting of the switch is the setting required for the type of program tape in the reader. If it is not, an error condition exists and the discriminator stops the tape reader. If the setting of the switch is correct for the type of tape in the tape reader the discriminator circuit produces an output signal to the printer to start the film strip and raw stock drive motors. Additional means are provided in the discriminator circuit for simplifying the corrective procedures that must be taken when an error condition is detected by the discriminator.

Other objects of the invention and its mode of operation will become apparent upon consideration of the following description and the accompanying drawings in which.

Figure 1:
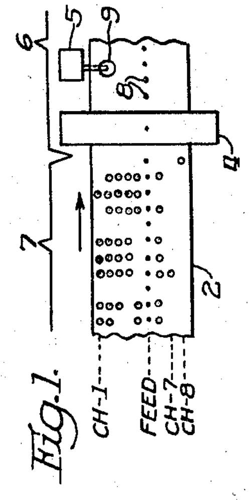
FIG. 1 shows a typical program tape.

FIG. 1 shows a conventional eight-channel perforated program tape 2, a tape sensing station 4, and a microswitch 5. The tape has a leader portion 6 which precedes a program portion 7 as the tape is moved through the sensing station in a conventional manner by sprockets (not shown) which engage feed or sprocket holes 8.

In the program portion of the tape are rows of perforations arranged transverse to the direction of tape movement. Each transverse row of perforations except the first represents one character of coded information for programming a film strip printer. The exact nature of this programming is not essential to an understanding of the present invention.

The first character of coded information in the program section of the tape is a start control and comprises a single perforation in channel eight designated the Start-8 hole. The Start-8 hole is punched as the first character in every tape, both forward and reverse tapes.

Each "reverse" tape is distinguished by a large hole 9 punched in the tape leader approximately three inches ahead of the program portion and on the same side of the sprocket hole as channel 1. This spacing insures that the large hole is sensed by microswitch 5 before the Start-8 hole is sensed by the tape sensing station 4. The reason for this requirement will become apparent when the operation of FIG. 2 is described.

Tapes designated "forward" tapes are distinguished by the absence of a large hole 9 in the tape leader.

Figure 2:
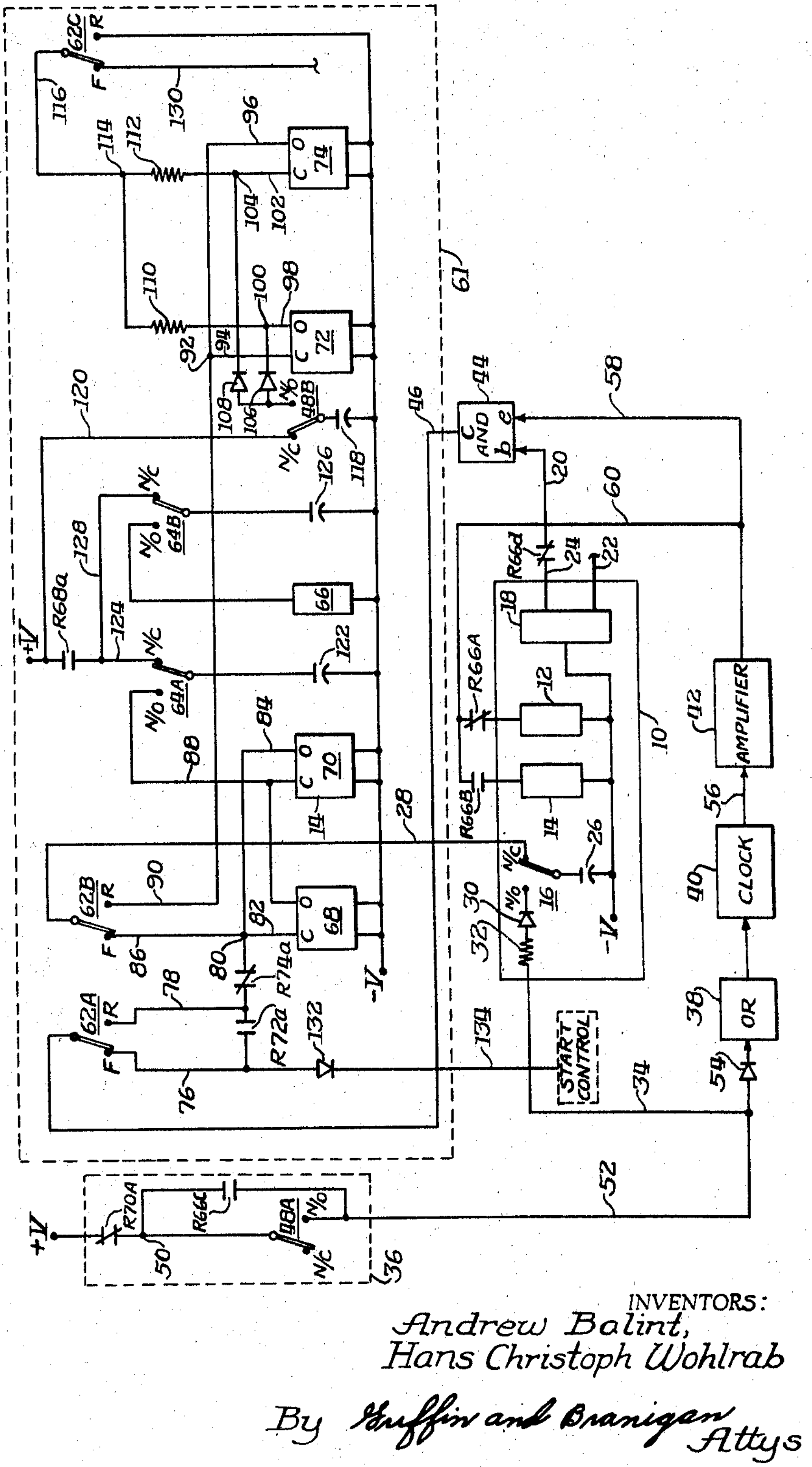
FIG. 2 is a circuit diagram of the invention.

A perforated tape reader 10 suitable for reading tapes 2 is shown in FIG. 2. The tape reader is of conventional design and may, for example, be a model 464P reader manufactured by Tally Industries. Since the tape reader is conventional, the drawing shows only those elements of the tape reader necessary for an understanding of the present invention. These elements include a forward tape feed clutch coil 12, a reverse tape feed clutch coil 14, a set of tape actuated contacts 16, and a set of star wheels contacts 18.

The coils 12 and 14 are actually the coils for escapement solenoids. Each time a three millisecond pulse is applied to the coil 12 an escapement armature associated with the coil is disengaged from an escape wheel thus permitting the tape to advance the distance between two characters on the program tape. In like manner, each pulse applied to coil 14 causes the tape to move backward a distance equal to the space between two characters.

The tape is read only when it is stepped in the forward direction. The tape sensor 4 (FIG. 1) includes eight four-point star wheel sensors, one for sensing perforations in each of the eight channels. One of the star wheel contacts 18 is associated with each star wheel and is normally open as long as no perforation is sensed by the star wheel. One terminal of each star wheel contact is connected to the negative side of the power supply (—v.) and the other terminal is connected to an output lead. The output leads for channels 1 through 7 are contained in a seven-wire cable 22 and are connected to the film printer circuits not shown in the drawing to control fading and light valve settings. Lead 24 is the output lead from the channel 8 star wheel contact.

The switch contacts 16 are associated with the micro-switch 5 shown in FIG. 1. The common terminal of the switch is connected through a capacitor 26 to the negative side of the power supply. The normally closed contact is connected to a lead 28 and the normally open contact is connected through a diode 30 and a resistor 32 to a lead 34. The switch contacts are in the normally open position as long as a tape is in the tape reader and a large hole is not sensed by microswitch 5, and transfers to the normally closed position when a large hole is sensed in the tape. As subsequently explained, capacitor 26 is charged from lead 34 when a tape is in the reader and no large hole is sensed and this charge is discharged through the normally closed contacts and lead 28 when a large hole is sensed.

For the sake of simplicity FIG. 2 shows only those circuits of the film strip printer necessary for an understanding of the present invention. These circuits include a start interlock circuit 36, an OR gate 38, a clock 40, an amplifier 42, and an AND gate 44.

The start interlock circuit includes a first set of start switch contacts 48A having a common terminal connected to a junction 50 and a normally open terminal connected to a lead 52. A pair of normally open relay contacts R66*c* are connected in parallel with the start switch contact between junction 50 and the lead 52. Junction 50 is connected through a set of normally closed relay contacts R70*a* to the positive side of the power supply. Thus, a positive voltage may be produced on the output lead 52 of the start interlock circuit if certain conditions within the start circuit are met. These conditions are subsequently described in detail.

The positive voltage on lead 52 is applied over lead 34 and through resistor 32 and diode 30 to the normally open contact of switch contacts 16 to thereby charge the capacitor 26 if a tape is present in the machine to hold the contacts 16 to their normally open position.

The positive voltage on lead 52 is also applied through a diode 54 and the OR gate 38 to condition the clock 40. The clock may be any conventional circuit which functions as a free-running multivibrator as long as a positive signal is applied to its input. Preferably, the clock is a multivibrator circuit which produces negative clock pulses of three milliseconds' duration with each of the clock pulses being separated from the next by an interval of six milliseconds. The clock pulses are applied over lead 56 to the amplifier 42. The amplifier amplifies and inverts the clock pulses and the amplified clock pulses pass over a lead 58 to one input of the AND gate 44. The amplified clock pulses also pass over a lead 60 to a set of normally closed relay contacts R66*a* and a set of normally open relay contacts R66*b*. When the contacts R66*b* are closed the clock pulses pass through these contacts to energize the coil 14 and backspace the tape. When the contacts R66*a* are closed the clock pulses pass through the contacts and energize the coil 12 to advance the tape one step in response to each clock pulse.

The AND gate 44 may comprise a conventional transistor having its base connected to the lead 20 and its emitter connected to the lead 58. When a Start-8 hole is sensed in the tape the voltage —v. is applied through the channel 8 star wheel contact, contacts 66*d*, and lead 20 to the base of the transistor. Each clock pulse is applied to the emitter of the transistor to sample the channel 8 output signal immediately prior to the time the tape is advanced. Lead 46 is connected to the collector of the transistor hence the AND gate 44 produces an output signal on lead 46 only when a Start-8 hole is sensed in the tape.

The discriminator circuit 61 includes a forward/reverse print control switch having three sets of contacts 62A, 62B, and 62C, a second set of contacts 48B operated by the start switch, a program reset switch having two sets of contacts 64A and 64B, and a plurality of relays 66, 68, 70, 72, and 74.

Relay 66 is a conventional single coil relay having a first set of normally closed contacts R66*a* connected between the output of amplifier 42 and the input to forward feed clutch coil 12 and a second set of normally closed contacts R66*d* connected between the channel 8 star wheel contact 18 and one input of AND gate 44. Relay 66 also has a first set of normally open contacts R66*b* connected between the output of amplifier 42 and the input of the reverse feed clutch coil 12, and a second set of normally open contacts R66*c* connected in a parallel circuit around start switch contacts 48A in the start interlock circuit.

Relays 68, 70, 72, and 74 are bistable reed contact relays. Each relay includes a set of contacts, first and second coils, and a permanent magnet biasing means. The arrangement is such that if the contacts of the relay are open they may be closed by applying a signal to the first relay coil through a terminal designated C. When the relays are in the closed position a magnetic circuit is established by the permanent magnet so as to hold the contacts in the closed position even after the input pulse to the first coil is terminated. When the contacts are in the closed position they may be opened by applying a signal to the second relay coil through a terminal designated O. The magnetic field generated by the current flowing through the second coil overcomes the magnetic bias and shifts the relay contacts to the open position. When the signal to the second relay coil is terminated the contacts remain open because the permanent magnet bias is insufficient to again close the contacts.

Relay 68 has one set of normally open contacts R68*a* connected between the positive voltage source and the normally closed terminals of program reset switch contacts 64A and 64B. Relay 70 has one set of normally closed relay contacts R70*a* connected in the start interlock circuit as previously described. Relay 72 has a single set of normally open contacts R72*a* connected between a pair of leads 76 and 78 which extend to the forward and reverse contacts, respectively, of switch contacts 62A. Relay 74 has a single set of normally closed contacts R74*a* connected between the lead 78 and a junction point 80.

Junction 80 is connected by a lead 82 to the close coil of relay 68 and by a lead 84 to the open coil of relay 70. Junction 80 is also connected by way of lead 86 to the forward contact of the forward/reverse print switch contacts 62B. The open coil of relay 68 and the close coil of relay 70 are connected by way of a lead 88 to the normally open contact of program reset switch contacts 64A.

A lead 90 extends between the reverse contact of forward/reverse switch contacts 62B and junction 92 and this junction is connected by way of leads 94 and 96 to the close coil of relay 72 and the open coil of relay 74. The open coil of relay 72 is connected by a lead 98 to a junction 100 and the close coil of relay 74 is connected by a lead 102 to a junction 104. Junctions 100 and 104 are connected through a pair of isolation diodes 106 and 108, respectively, to the normally open terminal of start switch contacts 48B. Junctions 100 and 104 are also connected through resistances 110 and 112, respectively, to a junction 114 and this junction is connected by way of a lead 116 to the common terminal of forward/reverse switch 62C.

The start switch is a manually operable pushbutton switch which remains operable only as long as it is manually depressed. Referring to the contacts 48B of this switch, the common terminal is connected through a capacitor 118 to the negative side of the power supply and the normally closed contact is connected by way of a lead 120 to the positive side of the power supply. With this arrangement the capacitor 118 is charged as long as the start switch is in its normally closed position and when the switch is manually actuated the capacitor discharges through the normally open contact and diodes 106 and 108 to actuate the open coil of relay 72 and the close coil of relay 74.

The program reset switch is a manually operable pushbutton switch which returns to the normally closed position as soon as manual operation is terminated. As previously stated, this switch has two sets of contacts designated 64A and 64B. The common terminal of switch contacts 64A is connected through a capacitor 122 to the negative side of the power supply and the normally closed contact is connected by a lead 124 and the normally open contact R68*a* to the positive side of the power supply. The common terminal of program reset switch contacts 64B is connected through a capacitor 126 to the negative side of the power supply and the normally closed contact is connected to the positive side of the power supply by a lead 128 and the normally open contacts R68*a*. As will become obvious from the subsequent description, the program reset switch is used to reset the discriminator circuits after the discriminator circuits have detected that the setting of the forward/reverse switch does not agree with the type of tape in the tape reader.

All control signals from the film strip printer and the tape reader enter the discriminator through contacts of the forward/reverse switch. The output of AND gate 44 is connected by the lead 46 to the common terminal of forward/reverse switch contacts 62A so that a pulse is applied to the discriminator circuit each time a Start-8 hole is sensed in the tape. The normally closed contact of switch contacts 16 is connected by way of lead 28 to the common terminal of forward/reverse contacts 62B so that capacitor 26 discharges into the discriminator circuit when the microswitch 5 senses the large hole in a reverse tape. A reset pulse appearing on lead 130 is used to open relay 72 and close relay 74 at the time the film strip printer circuits first set a light valve mechanism in the printer to print the first scene. This pulse is derived from the film strip printer circuits which are not shown and is applied to relays 72 and 74 only when the forward/reverse switch is set in the forward direction.

It will be understood that the forward/reverse switch has an additional set of contacts (not shown) which, when set in the forward position controls the driving means of the film strip printer so that the film strip being printed moves through the printer in the forward direction, and, when set in the reverse position, controls the movement of the film strip in the reverse direction.

Since it is possible to have either a forward tape or a reverse tape and since the forward/reverse switch may be set in a forward position or a reverse position, there are four possible combinations of switch settings and tapes which the discriminator circuit must recognize. The operation of the discriminator circuit for each of these conditions will now be described in detail. In the following description it is assumed that as an initial condition all of the relay contacts are in the position shown in FIG. 2 and that the tape has been loaded in the tape reader ready for feeding when the forward feed clutch is energized.

FORWARD PRINTING-FORWARD TAPE

The forward/reverse switch contacts 62A, 62B, and 62C are set to the forward position and since this is a forward program the program tape does not contain a large hole preceding the Start-8 hole. When the start button is depressed the start switch contacts 48B are transferred and capacitor 118 discharges through diodes 106 and 108 to energize the open coil of relay 72 and the close coil of relay 74. This insures that contact R72*a* is open and contact R72*b* is closed.

The depression of the start button also transfers start switch contacts 48A in the start interlock circuit thus applying a positive voltage to clock 40. The circuit is from the positive voltage course through contacts R70*a*, start switch contacts 48A, now closed, lead 52, and OR gate 38 to the input of the clock 40. As long as this positive signal is applied to the clock it generates a sequence of clock pulses which are amplified by amplifier 42 and pass over lead 58 to condition one input of AND gate 44. However, the AND gate produces no output at this time because the second input to the AND gate is not conditioned. The clock pulses also pass from amplifier 42 over lead 60 and through normally closed contacts R66*a* to the forward feed clutch coil 12. Each clock pulse applied to the coil causes the tape reader mechanism to advance the tape one character position. Since the leader portion of the perforated tape contains no coded punchings there are no output signals from the sensing circuits and the tape is advanced in step-by-step fashion until the Start-8 hole is sensed. When the Start-8 hole is sensed the channel 8 star wheel contact closes thus placing a −v. on lead 24 to condition the *b* input of AND gate 44. With both inputs conditioned, AND gate 44 produces a positive output signal that passes over lead 46, through forward/reverse switch contacts 62A, now set in the forward position, over lead 76, and through isolating diode 132 to output lead 134.

A signal on lead 134 indicates that the type of tape inserted in the tape reader agrees with the type of tape required by the setting of the forward/reverse switch. This signal may be applied to various control circuits in the film strip printer to start the printer drive motors and start the printing operation. These control circuits subsequently produce a signal which appears on lead 130 and passes through the forward/reverse switch contacts 62C, over lead 116 and through resistances 110 and 112 to energize the open coil of relay 72 and the close coil of relay 74. Actually, the relay 72 is in the open condition and the relay 74 is in the closed condition at this time so the reset signal appearing on lead 130 does not transfer the contacts of these relays.

REVERSE PRINTING-REVERSE TAPE

For this set of circumstances the forward/reverse switch contacts 62A, 62B, and 62C are set to the reverse position and a reverse tape having a large hole preceding the Start-8 hole is loaded into the tape reader.

When the start button is depressed start switch contacts 48B are transferred and the capacitor 118 discharges through diodes 106 and 108 to energize the open coil of relay 72 and the close coil of relay 74. Start switch contacts 48A in the start interlock circuit are transferred thus connecting the positive voltage source to the input of the clock. The circuit extends from the positive voltage source through contacts R70*a*, start switch contacts 48A, lead 52, and OR gate 38 to the clock.

Capacitor 26 is charged at the same time the clock is started. At the time the leader end of the perforated tape was manually inserted in the feed mechanism of the tape reader, the presense of the tape actuated switch contacts 16 so as to connect the common terminal of the switch to the normally open contact. The positive voltage appearing on lead 52 is connected through lead 34, resistor 32, diode 30, and switch contacts 16 normally open, to the capacitor 26. Thus, the capacitor 26 is charged when the start switch is closed.

As in the preceding example, the clock 40 produces a sequence of clock pulses which condition one input of AND gate 44 and pulse the forward feed clutch coil 12 to advance the tape 18. The tape is advanced step-by-step until the large hole is detected by microswitch 5 at which time the contacts of switch 16 transfer and apply the positive charge on capacitor 26 to the close coil of relay 72 and the open coil of relay 74. The circuit is from capacitor 26 through switch contacts 16 normally closed, lead 28, switch contacts 62B now in the reverse position, and lead 90, to junction 92. From junction 92 the signal passes over lead 94 to energize the close coil of relay 72 thus closing contacts R72*a*. From junction 92 the signal also passes over lead 96 to the open coil of relay 74 to open contacts R74*a*.

The clock pulses continue pulsing the forward tape feed clutch coil 12 thus advancing the tape and the large hole in the tape moves past the microswitch 5 so that the contacts 16 transfer to the normally open position. Feeding of the tape continues until the Start-8 hole is sensed by the channel 8 star wheel. At this time a negative signal appears on lead 24 to condition the *b* input of AND gate 44 which is receiving clock pulses on the input *e*. The AND gate produces a positive output signal that passes over lead 46, forward/reverse switch contacts 62A now in the reverse position, lead 78, contacts R72*a* now closed, and diode 132, to lead 134. As in the preceding example, the signal on lead 134 is an indication that the correct type of tape has been inserted in the tape reader and may be used to start the printing operation and the film strip printer drive motors.

FORWARD PRINTING-REVERSE TAPE

This is an abnormal condition that occurs when the operator sets the forward/reverse switch to the forward position but inserts a reverse program tape in the tape reader.

Upon depression of the start button start switch contacts 48B are transferred to discharge capacitor 118 through the open coil of relay 72 and the close coil of relay 74 as described in the preceding examples. Also, depression of the start button closes start switch contacts 48A to apply a positive voltage to the clock and to the capacitor 26. The clock signals are amplified and applied to AND gate 44 and the forward feed clutch coil 12 as previously described.

As the tape is advanced in a step-by-step fashion the large hole in the reverse tape is detected by microswitch 5 thus transferring contacts 16 to the normally closed position. Capacitor 26 discharges through switch contacts 16 normally closed, lead 28, forward/reverse switch 62B now set in the forward position, and lead 86, to the junction 80. From this point the discharge signal flows through lead 82 and the close coil of relay 68 to close contacts R68*a*, and through lead 84 and the open coil of relay 70 to open relay contacts R70*a*.

The opening of relay contacts R70*a* breaks the circuit between the positive voltage source and the input to the clock thereby stopping the clock. Since the clock no longer produces output pulses the forward feed clutch coil 12 is not pulsed and the tape stops its forward movement.

When relay contacts R68*a* close the positive voltage source is connected through these contacts to the normally closed contacts of the program reset switch contacts 64A and 64B. Since the program reset switch is not actuated at this time capacitors 122 and 126 are charged by the positive voltage.

At this point the tape reader and the film printer are interlocked so that nothing can be done until the error condition has been corrected. The operator may examine the forward/reverse print switch to determine if it is in the correct position. If the printer is supposed to print in the reverse direction the operator changes the setting of the forward/reverse print switch so that it is set for reverse printing. The operator then depresses the program reset button thereby switching contacts 64A and 64B. Capacitor 122 discharges through program reset switch contacts 64A normally open and lead 88 to energize the open coil of relay 68 and the close coil of relay 70. Simultaneously therewith, capacitor 126 discharges through program reset switch contacts 64B normally open and the coil of relay 66. Therefore, when the program reset switch is depressed relay contacts R68*a* open, contacts R70*a* close, contacts R66*a* and R66*d* open, and contacts R66*b* and R66*c* close.

A circuit is now formed from the positive voltage source through contacts R70*a*, contacts R66*c* now closed, lead 52, and OR gate 38, to the clock 40. This circuit is maintained as long as capacitor 126 discharges through the coil of relay 66 to maintain the contacts R66*c* in the closed position. During this interval the clock produces a sequence of output pulses that are amplified by amplifier 42 and pass over lead 60 and contacts R66*b* to the backspace coil 14. The capacitor 126 is chosen such that when it discharges through the coil of relay 66 the relay is energized for approximately 100 milliseconds. This allows approximately 15 clock pulses to pass through the contacts R66*b* to backspace the tape approximately 15 spaces. During this interval the contacts R66*d* are open to prevent the clock pulses from passing through AND gate 44 and contacts R66*a* are open to prevent the clock pulses from pulsing the forward feed clutch coil 12.

As the tape is backspaced the large hole sensor contacts 16 are again transferred to the normally open position by the pressure of the tape.

When relay 66 drops out the contacts R66*c* open in the start circuit thus removing the positive input signal to the clock. This stops the clock. A reverse printing operation may now be initiated by depressing the start button. The operation of the circuit from this point is the same as described above for the reverse printing-reverse tape condition.

If the operator had inspected the forward/reverse print switch at the time the machine stopped and found that the switch was in the correct position then it would be known that the wrong type of program tape had been placed in the tape reader. In this case the operator replaces the reverse tape with a forward tape and depresses the program reset switch. Relay 68 is opened and relay 70 is closed through the program reset switch contacts 64A normally open, and the relay 66 is energized through the program reset switch contacts 64B normally open to control the backspace operation. The backspace operation is carried out in exactly the same manner as described above. When the backspace operation terminates the operator may restart the circuit by depressing the start button. The operation of the circuit from this point on is the same as described above for the forward printing-forward tape condition.

REVERSE PRINTING-FORWARD TAPE

This is an abnormal condition that occurs when the operator sets the forward/reverse print switch to the reverse position but inserts a forward program tape in the tape reader. When the start button is depressed start switch contacts 48B transfer thus discharging capacitor 118 through the open coil of relay 72 and the close coil of relay 74. Start switch contacts 48A transfer to the normally open position thereby applying a positive voltage to the clock and to the capacitor 126. The clock is started and the amplified clock signals are applied to AND gate 44 and the forward feed clutch coil 12 as described above.

Since there is a forward tape in the tape reader there is no large hole in the tape to be sensed by the large hole sensing switch 16. Therefore, contacts 16 remain transferred to the normally open position. The clock pulses applied to the forward feed clutch coil advance the tape in a step-by-step fashion until the Start-8 hole is sensed in the tape. At this time the channel 8 star wheel contact closes to produce a negative signal that passes through contacts R66*d* to condition the *b* input of AND gate 44. A positive clock pulse on the input lead 58 conditions the *e* input of the AND gate and the gate produces a positive output signal on lead 46. The signal passes through forward/reverse switch contacts 62A now set in the reverse position, over lead 78, and through contacts R74*a* to the junction 80. From this point the signal passes through the close coil of relay 68 and the open coil of relay 70. This closes contacts R68*a* thereby completing the circuit to charge capacitors 122 and 126. The signal passing through the open coil of relay 70 opens the contacts R70*a* thereby removing the positive signal applied to the clock 40. This stops the clock and also stops the step-by-step forward advance of the tape.

The operator may now check the setting of the forward/reverse print switch to determine what caused the machine to stop. If the error is in the setting of the print switch the operator may switch it to the forward print position and then depress the program reset button. Closure of the program reset switch contacts 64A allows capacitor 122 to discharge through the open coil of relay 68 and the close coil of relay 70 thereby opening contacts R68*a* and closing contacts R70*a*. At the same time, closure of program reset switch contacts 64B normally open allows capacitor 126 to discharge through the coil of relay 66 thereby transferring the contacts associated with this relay. Closure of contacts R66*c* establishes a circuit from the positive voltage source through the contacts and OR gate 38 to energize the clock 40. Closure of contacts R66*b* allows the clock pulses produced by the clock to energize the tape backspace clutch coil 14 thereby backspacing the tape.

As soon as capacitor 126 discharges through relay 66 the relay returns to its normal or de-energized position so that the contacts R66*c* and R66*b* open thereby stopping the clock and preventing further clock pulses from energizing the backspace coil. At this point the operator may again depress the start button and the action from this point is the same as that described above for the forward printing-forward tape condition.

When the device stops and inspection of the forward/reverse print switch shows that it is in the correct position then the forward tape in the tape reader must be replaced with a reverse tape. The operator replaces the tape and depresses the program reset button. The discharge of capacitor 122 opens relay 68 and closes relay 70 while the discharge from capacitor 126 energizes relay 66. Relay 66 initiates the backspace operation as described above which terminates as soon as the capacitor 126 is discharged. When the backspace operation is terminated the operator may again start the circuit by depressing the start button. From this point the action of the circuit is the same as for the reverse print-reverse tape condition described above.

In summary, it is seen that use of the present invention prevents spoilage of raw stock caused by operator errors in inserting the wrong type of program tape. The signal on lead 134 starts the printer drive motors to drive the raw stock and the film strip being printed but this signal only occurs after the discriminator has determined that the setting of the forward/reverse print switch agrees with the type of program tape loaded into the tape reader.

For the sake of simplicity the invention has thus far been disclosed as embodied in a film strip printer assumed to have a single printing head. On the other hand, film strip printers now exist which employ two printing heads and printers of this type require two tape readers, one for controlling the corrections at each head. In these printers the correction data for tapes controlling one head (A) are different from the tapes controlling the other head (B). With four tapes to contend with it is obvious that the chances of an operator inserting the wrong tape is increased.

The teachings of the present invention may be applied to double head printers by adding an additional indicia on the tape leader ahead of the Start-8 hole and on the channel 8 side of the tape to indicate a B tape. Thus any forward tape will have no large hole on the channel 1 side and any reverse tape will have a large hole on the channel 1 side. Each A tape will have no large hole on the channel 8 side and each B tape will have a large hole on the channel 8 side.

The circuit of FIG. 2 may be modified to distinguish between A tapes and B tapes. The modification comprises an additional microswitch disposed along the tape feed path in the tape reader and positioned to sense a large hole in the tape leader on the channel 8 side. The switch contacts may be positioned in the run interlock circuit between the common terminal of the start switch contacts 48A and junction 50. The added switch contacts are normally closed when a tape is in the reader but open up to stop the clock when a large hole is sensed on the channel 8 side of the tape indicating a B program tape. Thus, the circuit of FIG. 2, when modified, becomes a suitable discriminator for use in an "A" head control. A similar circuit with slight modification may be employed for use in a "B" head control.

From the above description it is also obvious that the present invention is not limited to use with a film strip printer. The forward/reverse switch may be a mode control switch in any type of device which is capable of operating in either of two modes and requires a different program tape for each mode of operation. Furthermore, it is not essential to the present invention that the program tape be a perforated tape. The indicia recorded on the tape may be in the form of magnetic or light reflective spots rather than perforations. The term indicia as used herein includes the presence or the absence of a physical mark.

The embodiments of the invention in which an exclusive property or privilege is claimed are defined as follows:

1. A program tape for use in a tape reader of the type having a plurality of channel sensors, and additional sensing means for sensing indicia identifying the type of tape in said tape reader, said program tape comprising:
- an elongated strip of material having a leader portion and a program portion,
  - said program portion including a plurality of program characters manifested by indicia carried by said tape,
    - said indicia being positioned in a plurality of channels which extend along the length of said tape with the indicia manifesting a particular program character being arranged in a row extending transverse to the length of said tape,
    - the first of said program characters being a program start character,
  - said leader portion including indicia identifying the type of tape, said identifying indicia being positioned to be sensed by said additional sensing means before said program start character is sensed by said channel sensors as said tape moves through said tape reader.

2. A program tape as claimed in claim 1 wherein said identifying indicia and said program character indicia are different.

3. A program tape as claimed in claim 1 wherein said identifying indicia are larger than said program character indicia.

4. A program tape as claimed in claim 3 wherein said identifying indicia and said program character indicia are perforations in said tape.

5. A program tape as claimed in claim 4 wherein said identifying indicia comprises a single perforation identifying said tape as being of a first type, and the absence of said perforation identifies said tape as being of a second type.

6. A program tape as claimed in claim 4 wherein said identifying indicia comprises first and second perforations, the presence of said first perforation and the absence of said second perforation identifying said tape as being of a first type,
the absence of said first and second perforations identifying said tape as being of a second type,
the presence of said first and second perforations identifying said tape as being of a third type, and
the absence of said first perforation and the presence of said second perforation identifying said tape as being of a fourth type.

7. The combination comprising:
a device including mode control means having first and second states for controlling said device to operate in a first or a second mode,
a tape reader,
said tape reader having first means for sensing program indicia and start indicia carried by a tape fed through said tape reader,
said tape reader having second means for sensing further indicia carried by said tape and producing a first or a second signal identifying said tape as being of a first type or a second type,
and discriminator means including first and second circuit means for producing an output signal,
said first circuit means including means responsive to said first means, said mode control means when in said first state, and a first signal from said second means,
said second circuit means including means responsive to said first means, said mode control means when in said second state, and a second signal from said second means.

8. In a film strip printer having direction control means settable to a first or a second state for controlling said printer to feed film in a forward or a reverse direction, said printer requiring a forward program tape when feeding in the forward direction and a reverse program tape when feeding in the reverse direction, the improvement comprising:
a program tape reader,
said tape reader having first means for sensing program start indicia carried by a tape feeding therethrough,
said tape reader having second means for sensing further indicia carried by a tape feeding therethrough, said further indicia identifying a tape as being a forward tape or a reverse tape,
clock pulse generator means for producing clock pulses,
means for applying said clock pulses to said tape reader to advance said tape whereby indicia may be sensed by said first and second means,
and a discriminator including circuit means controlled by said direction control means and responsive to said first and second means for producing an output signal when start indicia is sensed if the type of tape in said tape reader is the type required by the setting of said direction control means.

9. The improvement as claimed in claim 8 wherein said discriminator includes further circuit means controlled by said direction control means and responsive to said first and second means for stopping said clock pulse generator if the type of tape in said tape reader is not the type required by the setting of said direction control means.

10. In a film strip printer having forward/reverse switch means for controlling printing in a forward or a reverse direction, the improvement comprising:
a tape reader,
said tape reader having first means for sensing program indicia and start code indicia on a tape advancing therethrough,
said tape reader having second means for sensing further indicia recorded on said tape to identify said tape as a forward tape or a reverse tape, said second sensing means being positioned to sense said further indicia before said first sensing means senses said start code indicia,
a clock pulse generator for producing clock pulses,
means for applying said clock pulses to said tape reader to advance a tape therethrough,
a discriminator circuit including,
stop control means,
storage means, and
first circuit means including said forward/reverse switch means responsive to said second sensing means for setting said stop means or said storage means,
and means responsive to said stop means for stopping said clock pulse generator.

11. The improvement as claimed in claim 10 wherein said discriminator circuit includes,
second circuit means including said forward/reverse switch means and means responsive to said storage means,
said second circuit means being responsive to said first sensing means to set said stop means when a start code indicia is sensed if said forward/reverse switch means is set for controlling reverse printing and said storage means is not set.

12. The improvement as claimed in claim 11 wherein said discriminator circuit includes,
third circuit means, including said forward/reverse switch means and means responsive to said storage means,
said third circuit means being responsive to said first sensing means for producing a start signal when said forward/reverse switch means is set for controlling forward printing, or when said forward/reverse switch means is set for controlling reverse printing and said storage means has been set.

13. The improvement as claimed in claim 12 and further comprising:
a start interlock circuit including a start switch and said means responsive to said stop means for energizing said clock when said start switch is closed and said stop means is not set.

14. The improvement as claimed in claim 13 and further comprising:
tape backspace means,
reset switch means,
means responsive to said stop means for conditioning said reset switch means,
first means responsive to said next switch means for resetting said stop means,
and second means responsive to said reset switch means for energizing said clock pulse generator,
said backspace means being responsive to each clock pulse to backspace said tape as long as said reset switch means is conditioned.

15. The improvement as claimed in claim 12 wherein said first sensing means includes an AND gate responsive to said start code and a clock pulse from said clock, said second and said third circuit means being responsive to output signals produced by said AND gate.

References Cited

UNITED STATES PATENTS 2,943,554 7/1960 Kastner ---------- 355—111 X

JOHN M. HORAN, Primary Examiner

U.S. Cl. X.R.

355—83